United States Patent [19]

Redlich

[11] 4,318,575
[45] Mar. 9, 1982

[54] MOBILE FILE CABINET WITH DRAWER STABILIZING WHEEL SUPPORT MEANS

[75] Inventor: William R. Redlich, Winnetka, Ill.

[73] Assignee: Eagle Sheet Metal Mfg. Company, Niles, Ill.

[21] Appl. No.: 222,243

[22] Filed: Jan. 2, 1981

[51] Int. Cl.³ .............................................. A47B 63/02
[52] U.S. Cl. .................................... 312/250; 312/270; 312/273; 312/343; 297/143
[58] Field of Search ............... 312/250, 270, 273, 320, 312/343, 346, 307, 201, 278, 327, 209; 297/140, 143

[56] References Cited

U.S. PATENT DOCUMENTS

| | | | |
|---|---|---|---|
| Re. 26,902 | 5/1970 | Levenberg | 312/273 |
| 187,429 | 2/1877 | Sykes | 297/143 |
| 542,341 | 7/1895 | Little | 312/250 |
| 1,851,855 | 3/1932 | Lindemann et al. | 312/343 |
| 1,893,624 | 1/1933 | Jay | 312/270 |
| 2,074,371 | 3/1937 | Cummings et al. | 312/343 |
| 2,142,898 | 1/1939 | Harmon | 312/343 |
| 2,587,691 | 3/1952 | Brewer | 312/343 |
| 2,644,737 | 7/1953 | Davis | 312/270 |
| 3,015,532 | 1/1962 | Wilson | 312/343 |
| 3,022,129 | 2/1962 | Manson | 312/343 |
| 3,094,363 | 6/1963 | Fremstad et al. | 312/343 |
| 3,281,198 | 10/1966 | Anderson et al. | 312/343 |
| 3,335,326 | 8/1967 | Bonin et al. | 312/273 |
| 3,384,431 | 5/1968 | Dargene | 312/343 |
| 3,936,106 | 2/1976 | Harper | 312/250 |
| 4,261,626 | 4/1981 | Hornbacher | 312/250 |

FOREIGN PATENT DOCUMENTS

| | | | |
|---|---|---|---|
| 287872 | 2/1914 | Fed. Rep. of Germany | 297/140 |
| 2646380 | 4/1978 | Fed. Rep. of Germany | 312/250 |

*Primary Examiner*—Victor N. Sakran
*Attorney, Agent, or Firm*—McCaleb, Lucas & Brugman

[57] ABSTRACT

A file cabinet comprises a case mounted on four caster wheels for mobility. A stabilizing wheel is mounted on the underside of a lower drawer behind the front edge. When the drawer is open, the wheel engages the floor and supports the forward end portion of the lower drawer independently of the case. When the drawer is closed, the stabilizing wheel nests within a forwardly open slot in the bottom wall of the case and is automatically elevated out of engagement with the floor. In an alternate form, the stabilizing wheel provides floor support for the drawer in its closed position.

4 Claims, 7 Drawing Figures

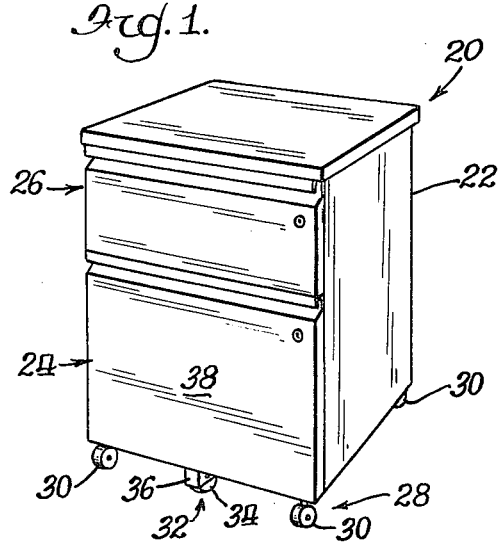
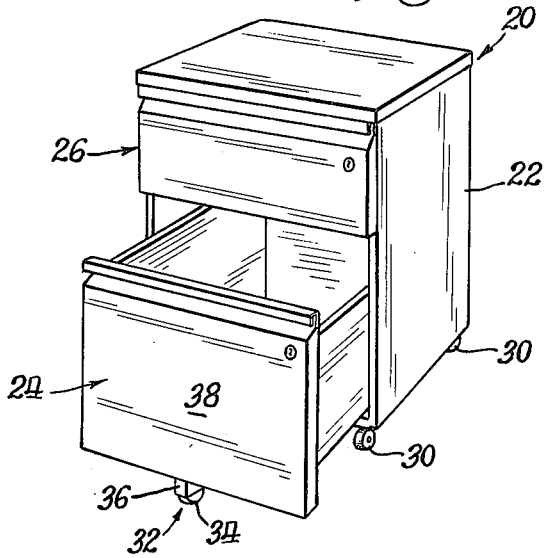
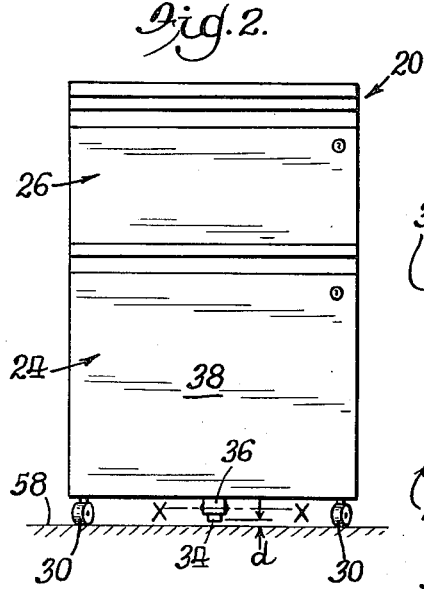
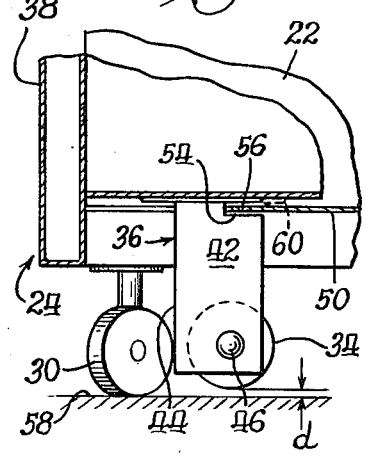
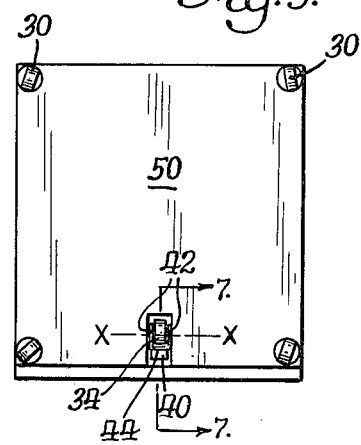
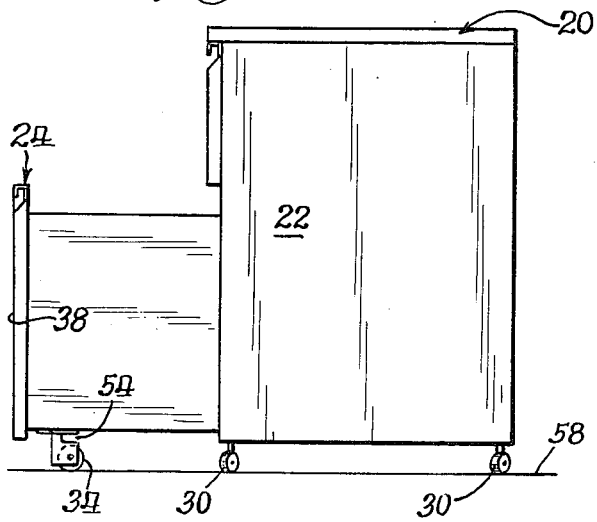
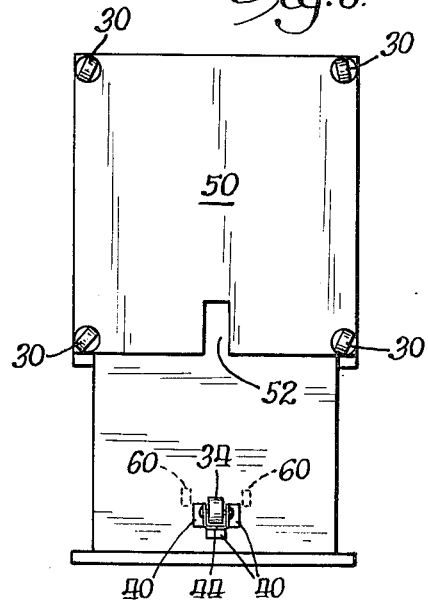

MOBILE FILE CABINET WITH DRAWER STABILIZING WHEEL SUPPORT MEANS

BACKGROUND OF THE INVENTION

Cabinets for storage of computer-related materials such as tape reels, printouts, information binders, and the like are, typically, caster-mounted for mobility between work stations, and have a deep, lower drawer providing space for large, heavy reels and binders. If the lower drawer is filled with such heavy items it is likely to tip the cabinet forward when fully or even partly opened. This situation is in need of improvement.

SUMMARY OF THE INVENTION

Therefore, a principal object of the present invention is to provide a mobile file cabinet with floor-engageable stabilizing wheel support means on the underside of a lower drawer to prevent the cabinet from tipping when the drawer is opened while heavily loaded.

Another object is to provide such a mobile file cabinet in which the stabilizing wheel support means nests within a forwardly open slot in a bottom wall of the case when the lower drawer is closed.

Another object is to provide such a mobile file cabinet mounted on caster wheels and having a stabilizing wheel centered on the underside of the lower drawer behind the front edge, the stabilizing wheel being rotatable about a fixed, horizontal axis which is transverse to the direction of movement of the drawer.

Another object is to provide such a mobile file cabinet in which the stabilizing wheel is automatically elevated above the floor when the lower drawer is closed, enabling the cabinet to be moved readily in any direction independently of the stabilizing wheel.

Another object is to provide such a mobile file cabinet in which the stabilizing wheel is substantially at the same level as the caster wheels thereby enabling the stabilizing wheel to support the lower drawer throughout substantially its entire range of opened positions.

Another object is to provide such a mobile file cabinet in which the stabilizing wheel provides floor support for the lower drawer in all opened and closed positions.

BRIEF DESCRIPTION OF THE DRAWINGS

Other objects and advantages will be apparent from the following description taken in connection with the accompanying drawings in which:

FIG. 1 is a perspective view of a mobile file cabinet illustrating a preferred form of the present invention, with the drawers closed;

FIG. 2 is a front view of FIG. 1;

FIG. 3 is a bottom view of FIG. 1;

FIG. 4 is a view similar to FIG. 1, with the lower drawer opened;

FIG. 5 is a side view of FIG. 4;

FIG. 6 is a bottom view of FIG. 4; and

FIG. 7 is a fragmentary, vertical, sectional view of FIG. 3 taken on line 7—7.

Like parts are designated by like reference characters throughout the drawings.

DETAILED DESCRIPTION OF THE PREFERRED EMBODIMENT

Referring now to the drawings in greater detail, the cabinet generally designated 20 comprises a case 22 with a lower drawer 24 and an upper drawer 26, these being movable in and out of lower and upper compartments in the case. The lower drawer is substantially larger and deeper to hold large tape reels, heavy binders, and other bulky items needed in a computer system. The cabinet and drawers may be of conventional construction, with full-suspension drawer supports which are well-known in the art, so these details will not be further described.

The case 22 is supported by roller means 28, enabling it to be moved readily from one work station to another. The roller means comprises casters 30 at the four bottom corners of the case.

The crux of the present invention is the stabilizing wheel means 32. This comprises a stabilizing wheel 34 supported in a bracket 36 attached as by spot welding to the underside of the lower drawer 24 behind the drawer front panel 38. Tabs 40 provide a ready means for spot welding, or otherwise attaching the bracket to the drawer. The bracket 36 is U-shaped in plan view as shown in FIGS. 3 and 6, having side legs 42, 42 interconnected by a center section 44. The side legs support an axle pin 46 about which stabilizing wheel 34 turns. Thus, as shown in FIGS. 2, 3 and 6, the axle pin 46 is fixed and journals the wheel 34 for rotation about a fixed horizontal axis X—X which is transverse to the direction of movement of the drawer. This provides sidewise stability, as well as supporting the lower drawer independently of the case when the drawer is opened.

As shown in FIGS. 3, 6 and 7, the bottom wall 50 of the case has a forwardly open slot 52 within which the stabilizing wheel 34 and its bracket 36 nest when the lower drawer is closed. The opposite side legs 42 have rearwardly open slots 54 which receive a portion 56 of the bottom wall 50 when the drawer is closed, as best shown in FIGS. 3 and 7.

The stabilizing wheel means 32 may be positioned to provide either of two modes:

(1) with the wheel 34 bearing on the floor 58 when the lower drawer is opened, and elevated above the floor when the drawer is closed, as shown in the embodiment illustrated; and (2) with the wheel 34 bearing on the floor in both opened and closed positions of the lower drawer. The second mode is not specifically shown in the drawings but will be clear from the following description. These two modes will now be described.

Most filing cabinets of this kind normally have enough vertical play between the drawers and the case so the stabilizing wheel 34 will drop to engage the floor in the opened position of the drawer and will be lifted by the front edge of the case a distance "d" above the floor, when the drawer is closed. To increase this lift of wheel 34 between opened and closed drawer positions, a short cam 60 (FIGS. 6 and 7) can be provided on each side of the lower drawer if desired. Such cams of course would be optional, and generally would not be necessary where the cabinet is used on a smooth, tiled floor. Cams 60 would be advantageous when the cabinet is used on a rug to lift the stabilizing wheel above the nap of the rug.

The second mode mentioned above is not specifically shown in the drawings but could be achieved simply by making the bracket 36 long enough to keep the stabilizing wheel 34 engaged with the floor in both opened and closed positions of the drawer. This mode would have the advantage of restricting sidewise movement of the cabinet in both closed and opened drawer positions and would tend to stabilize the cabinet in use.

While certain novel features of this invention have been shown and described and are pointed out in the annexed claims, it will be understood that various omissions, substitutions and changes in the forms and details of the cabinet illustrated and its operation can be made by those skilled in the art without departing from the spirit of the invention. For example, while a two-drawer filing cabinet is illustrated, the invention would be equally applicable to one having a single drawer, or more than two drawers.

The embodiments of the invention in which an exclusive property or privilege is claimed are defined as follows:

1. A mobile file cabinet comprising:
   a case which is generally rectangular in horizontal cross-section;
   floor-engaging swivel caster means on the bottom of the case at four corners thereof;
   at least one drawer movable between an opened position and a closed position within a compartment in a lower portion of the case;
   drawer stabilizing wheel support means on the underside of the drawer immediately behind the front edge of the drawer and being rotatable about a fixed horizontal axis which is transverse to the direction of movement of the drawer; and
   means supporting the drawer in said case providing sufficient vertical play between the front edge of the drawer and the case to lower the stabilizing wheel support means to engage the floor in opened position and to lift the stabilizing wheel support means out of engagement with the floor in closed position;
   whereby when said drawer is in closed position, said cabinet can be moved in any direction on the swivel caster means to or from a work site without interference by the drawer stabilizing wheel support means, and whereby further, when the drawer is in opened position at a work site with the stabilizing wheel support means engaging on the floor, it will be stabilized against unintended sidewise movement and forward tilting movement.

2. A mobile file cabinet according to claim 1 in which the case has a bottom wall defining the floor of said compartment, and said bottom wall has means forwardly open slot receiving said drawer stabilizing wheel support means when the drawer is closed.

3. A mobile file cabinet according to claim 1 in which said drawer stabilizing wheel support means comprises a stabilizing wheel at the middle of the drawer adjacent the front edge thereof.

4. A mobile file cabinet according to claim 1 in which cam means is provided between the drawer and case to increase the lift of the stabilizing wheel support means when the drawer is moved from opened to closed positions, thereby providing clearance to facilitate multidirectional movement of the cabinet across a rug-covered floor without interference by the stabilizing wheel support means.

* * * * *

UNITED STATES PATENT AND TRADEMARK OFFICE
CERTIFICATE OF CORRECTION

PATENT NO. : 4,318,575

DATED : March 9, 1982

INVENTOR(S) : William R. Redlich

It is certified that error appears in the above—identified patent and that said Letters Patent is hereby corrected as shown below:

Column 4, line 16, after "has" delete "means"; and

Column 4, line 17, after "slot" insert -- means --.

Signed and Sealed this

Twenty-fifth Day of May 1982

[SEAL]

Attest:

Attesting Officer

GERALD J. MOSSINGHOFF

Commissioner of Patents and Trademarks